Nov. 24, 1931. J. A. FAUCHER ET AL 1,833,019
AIRPLANE TIRE
Filed Nov. 1, 1929

INVENTORS
Joseph A. Faucher
Erle P. Halliburton
BY
ATTORNEY

Patented Nov. 24, 1931

1,833,019

UNITED STATES PATENT OFFICE

JOSEPH A. FAUCHER, OF DETROIT, MICHIGAN, AND ERLE P. HALLIBURTON, OF TULSA, OKLAHOMA, ASSIGNORS TO MORGAN & WRIGHT, A CORPORATION OF MICHIGAN

AIRPLANE TIRE

Application filed November 1, 1929. Serial No. 404,165.

This invention relates to improvements in airplane tires, more particularly to the provision of means thereon to facilitate the landing of an airplane.

An object of this invention is to provide means on a tire whereby the inertia to acceleration of the tire is overcome in the landing of an airplane. A further object of this invention is to provide means at the side walls of the tire to overcome air resistance in such a manner so as to cause rotation of the tire wheels while the airplane is in flight.

Ordinarily, when an airplane is landing with the wheels stationary, a condition is encountered whereby the plane has a tendency to "nose" over. This in part is due to the inertia of the wheels caused by the sudden acceleration. Through the application of cupped or pocket-like projections adapted to the side-walls of the tires this condition is substantially overcome, and is effected by the wheels rotating at a speed approaching the landing speed of the plane.

The improvement is illustrated in the accompanying drawings, in which.

Figure 1:
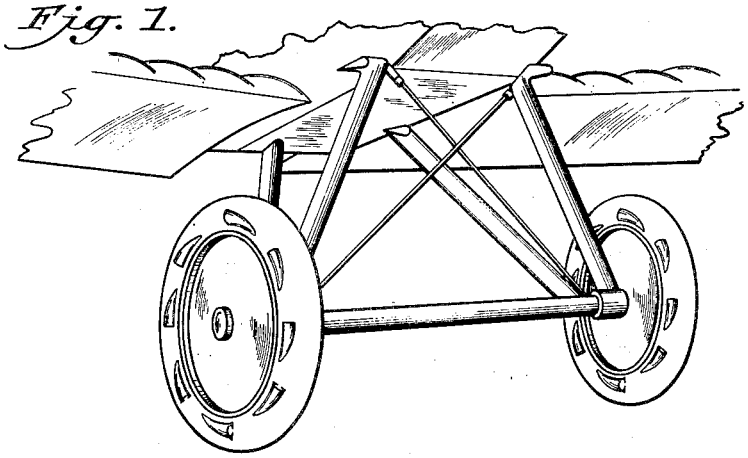
Fig. 1 is a perspective of an aircraft undercarriage illustrating a form of application of the improvement herein described.
Figure 2:
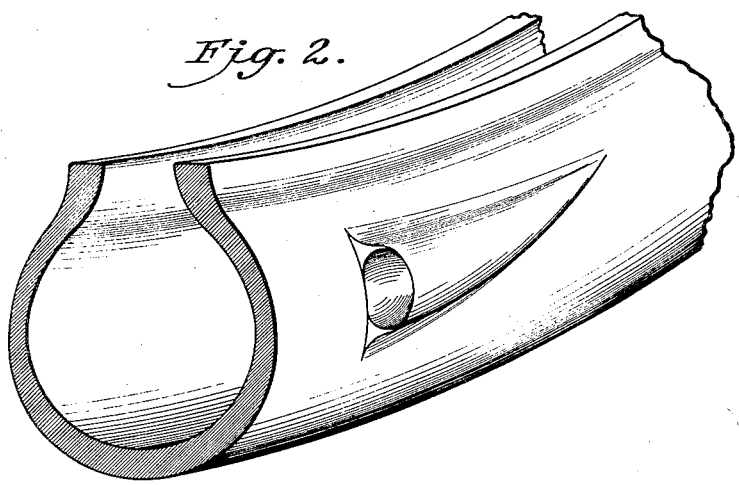
Fig. 2 is an enlarged sectional perspective view of a tire showing one of the cup-like projections adapted to the tire sidewall.
Figure 3:
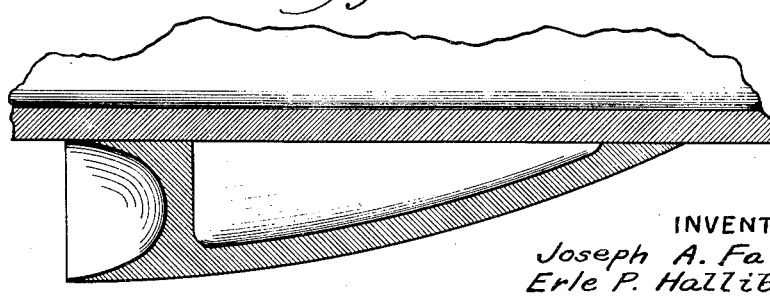
Fig. 3 illustrates a longitudinal section through the air pocket and the side-wall of the tire.

Referring to the drawings the casing indicated by the numeral 1, which may be of any size and type and not necessarily of the usual construction conventionally illustrated in cross section, is shown equipped with a plurality of projections or vanes 2 which may be of any suitable and convenient shape to effect rotation of the wheel on which the tire is supported. Preferably but not necessarily, the projections 2 are made of rubber and are secured by cement 3 (vulcanizable or unvulcanizable) to the side walls of the casing. If desired, however, these projections may be formed integral by being united thereto in the final vulcanizing operation incident to the manufacture of the casing. Desirably the projections 2 are hollowed out as indicated at 4 to lighten the weight, the correspondingly tapered outer wall 5 of the projection affording a stream line contour minimizing resistance to rotation of the casing in one direction, rotation in the opposite direction being effected by the provision of pockets or recesses 6 provided in the end walls of the projections 2. A plurality of such projections 2 are provided on one or both side walls of the casing as may be desired and are preferably arranged to extend in the same direction with reference to the circumference of the tire, as many projections 2 being provided as are deemed sufficient to obtain the desired angular velocity. The pockets or recesses 6 of the projections 2 are preferably so faced, when the casing is mounted on the wheel of an airplane, that they will cause the wheels to revolve in the same direction as the wheels are revolved when the plane lands. Obviously the projections 2 should be placed substantially equal distances apart around the side walls of the casing to ensure uniform rotation.

While the construction above described in detail and illustrated in the drawings is preferred, it is obvious that many changes may be made in the material and the form or shape and in the construction of the parts without departing from the principle underlying the invention, and reference should therefore be made to the appended claims for an understanding of its scope.

Having thus described our invention, what we claim and desire to protect by Letters Patent is:

1. An airplane tire having a series of circumferentially spaced elongated vanes projecting from at least one side wall of the tire, said elongated vanes being disposed with their longitudinal axis extending circumferentially of the tire and having concave recesses in one end, and said vanes gradually tapering in the direction of rotation of the tire when the plane is landing, from the blunt ends formed by the recesses to the tips of the vanes.

2. An airplane tire having a series of circumferentially spaced elongated vanes projecting from at least one side wall of the tire, said elongated vanes being disposed with their longitudinal axis extending circumferentially of the tire and having concave recesses in one end, said vanes gradually tapering in the direction of rotation of the tire when the plane is landing, from the blunt ends formed by the recesses to the tips of the vanes, and said vanes being hollowed out next to the side wall of the tire and between the said concave recess and tip.

Signed at Detroit, county of Wayne, State of Michigan, this 30th day of September, 1929.

JOSEPH A. FAUCHER.

Signed at Tulsa, county of Tulsa, State of Oklahoma, this 15th day of October, 1929.

ERLE P. HALLIBURTON.